US008017231B1

(12) United States Patent
Ahlgren et al.

(10) Patent No.: US 8,017,231 B1
(45) Date of Patent: Sep. 13, 2011

(54) HEAT SHRINKABLE FILMS CONTAINING SINGLE SITE CATALYZED COPOLYMERS HAVING LONG CHAIN BRANCHING

(75) Inventors: Kelly R. Ahlgren, Greenville, SC (US); Robert Babrowicz, Spartanburg, SC (US); Solomon Bekele, Taylors, SC (US); Blaine C. Childress, Inman, SC (US); Marvin R. Havens, Greer, SC (US); Ronald D. Moffitt, Spartanburg, SC (US); Gautam P. Shah, Simpsonville, SC (US); George D. Wofford, Duncan, SC (US)

(73) Assignee: Cryovac, Inc., Duncan, SC (US)

( * ) Notice: Subject to any disclaimer, the term of this patent is extended or adjusted under 35 U.S.C. 154(b) by 2819 days.

(21) Appl. No.: 09/583,654

(22) Filed: May 30, 2000

Related U.S. Application Data

(63) Continuation of application No. 08/962,825, filed on Nov. 3, 1997, now abandoned, which is a continuation of application No. 08/018,657, filed on Feb. 17, 1993, now abandoned, which is a continuation-in-part of application No. 07/983,017, filed on Nov. 30, 1992, now abandoned, which is a continuation-in-part of application No. 07/976,122, filed on Nov. 13, 1992, now abandoned.

(51) Int. Cl.
B32B 27/32 (2006.01)

(52) U.S. Cl. ......... 428/349; 428/515; 428/520; 428/523

(58) Field of Classification Search .................. 525/240; 526/943, 348, 348.1, 348.2, 348.3, 348.4; 428/515, 516, 523, 910, 34.9, 520, 3, 49
See application file for complete search history.

(56) References Cited

U.S. PATENT DOCUMENTS

| | | | |
|---|---|---|---|
| 3,022,543 A * | 2/1962 | Baird, Jr. et at | 428/34.9 |
| 3,161,629 A | 12/1964 | Gorsich | |
| 3,456,044 A | 7/1969 | Phalke | |
| 3,555,604 A | 1/1971 | Pahlke | |
| 3,645,992 A | 2/1972 | Elston | |
| 3,899,535 A | 8/1975 | Brown et al. | |
| 3,900,635 A | 8/1975 | Funderburk, Jr. et al. | |
| 3,908,070 A | 9/1975 | Marzolf | |
| 4,064,296 A | 12/1977 | Bornstein et al. | |
| 4,302,565 A | 11/1981 | Goeke et al. | |
| 4,302,566 A | 11/1981 | Karol et al. | |
| 4,306,041 A | 12/1981 | Cozewith et al. | |
| 4,399,181 A | 8/1983 | Yoshimura et al. | |
| 4,424,243 A | 1/1984 | Nishimoto et al. | |
| 4,429,079 A | 1/1984 | Shibata et al. | |
| 4,456,646 A | 6/1984 | Nishimoto et al. | |
| 4,457,960 A | 7/1984 | Newsome | |
| 4,469,753 A | 9/1984 | Yoshimura et al. | |
| 4,500,682 A | 2/1985 | Chiba et al. | |
| 4,501,634 A | 2/1985 | Yoshimura et al. | |
| 4,532,189 A * | 7/1985 | Mueller | 428/516 |
| 4,540,753 A | 9/1985 | Cozewith et al. | |
| 4,551,380 A | 11/1985 | Schoenberg | |
| 4,563,512 A | 1/1986 | Goodall | |
| 4,615,922 A * | 10/1986 | Newsome et al. | 428/35 |
| 4,640,856 A | 2/1987 | Ferguson et al. | |
| 4,643,945 A | 2/1987 | Kiang | |
| 4,647,483 A | 3/1987 | Tse et al. | |
| 4,683,170 A | 7/1987 | Tse et al. | |
| 4,701,432 A | 10/1987 | Welborn, Jr. | |
| 4,755,403 A | 7/1988 | Ferguson | |
| 4,777,095 A | 10/1988 | Kondo et al. | |
| 4,820,557 A | 4/1989 | Warren | |
| 4,833,024 A | 5/1989 | Mueller | |
| 4,837,084 A | 6/1989 | Warren | |
| 4,863,768 A | 9/1989 | Ishio et al. | |
| 4,863,769 A | 9/1989 | Lustig et al. | |
| 4,865,902 A | 9/1989 | Golike et al. | |
| 4,871,705 A | 10/1989 | Hoel | |
| 4,909,881 A | 3/1990 | Garland | |
| 4,935,397 A | 6/1990 | Chang | |
| 4,976,898 A | 12/1990 | Lustig et al. | |
| 4,985,188 A | 1/1991 | Ishio et al. | |
| 5,001,016 A | 3/1991 | Kondo et al. | |
| 5,004,647 A | 4/1991 | Shah | |
| 5,023,143 A | 6/1991 | Nelson | |
| 5,032,463 A | 7/1991 | Smith | |
| 5,041,316 A | 8/1991 | Parnell et al. | |
| 5,055,438 A | 10/1991 | Canich | |
| 5,057,475 A | 10/1991 | Canich et al. | |

(Continued)

FOREIGN PATENT DOCUMENTS

AU 681116 8/1997

(Continued)

OTHER PUBLICATIONS

U.S. Appl. No. 07/961,269, filed Oct. 14, 1992, Walton et al. U.S. Appl. No. 07/955,614, filed Oct. 2, 1992, Garza et al.
Apr. 23, 1993, Office Action in U.S. Appl. No. 07/976,122.
Sep. 23, 1993, Amendment in U.S. Appl. No. 07/976,122.
Dec. 10, 1993, Office Action in U.S. Appl. No. 07/976,122.
Mar. 10, 1994, Amendment under 37 CFR 1.111 in U.S. Appl. No. 07/976,122.
May 31, 1994, Office Action in U.S. Appl. No. 07/976,122.
Nov. 30, 1994, Amendment under 37 CFR 1.116 in U.S. Appl. No. 07/976,122.
Jan. 9, 1995, Notice of Allowability in U.S. Appl. No. 07/976,122.
Jan. 9, 1995, Notice of Allowance and Statement of Reasons for Allowance in U.S. Appl. No. 07/976,122.
May 25, 1995, Notice of Abandonment in U.S. Appl. No. 07/976,122.
Apr. 23, 1993, Office Action in U.S. Appl. No. 07/983,017.
Sep. 23, 1993, Express Abandonment in U.S. Appl. No. 07/983,017.
Oct. 4, 1993, Notice of Abandonment in U.S. Appl. No. 07/983,017.
Apr. 23, 1993, Office Action in U.S. Appl. No. 08/018,657.
Sep. 23, 1993, Amendment in U.S. Appl. No. 08/018,657.
Nov. 30, 1993, Office Action in U.S. Appl. No. 08/018,657.
Feb. 28, 1994, Amendment under 37 CFR 1.111 in U.S. Appl. No. 08/018,657.

(Continued)

Primary Examiner — D. Lawrence Tarazano
(74) Attorney, Agent, or Firm — Rupert B. Hurley, Jr.

(57) ABSTRACT

The present invention is directed to a heat-shrinkable, thermoplastic film or bag which contains at least one homogeneous ethylene alpha-olefin copolymer with at least some limited long chain branching. Oriented films made in accordance with the present invention exhibit improved processability as well as improved physical properties such as excellent optics and impact resistance. A homogeneous ethylene alpha-olefin with long chain branching may be present in a monolayer film either alone or in a blend or may be included in one or more layers of a multilayer film in accordance with the present invention.

7 Claims, No Drawings

U.S. PATENT DOCUMENTS

| | | | |
|---|---|---|---|
| 5,059,481 A | 10/1991 | Lustig et al. | |
| 5,064,797 A | 11/1991 | Stricklen | |
| 5,064,802 A | 11/1991 | Stevens et al. | |
| 5,084,534 A | 1/1992 | Welborn, Jr. et al. | |
| 5,088,228 A | 2/1992 | Waldie, Jr | |
| 5,089,321 A | 2/1992 | Chum et al. | |
| 5,132,074 A | 7/1992 | Isozaki et al. | |
| 5,132,380 A | 7/1992 | Stevens et al. | |
| 5,145,950 A | 9/1992 | Funaki et al. | |
| 5,206,075 A | 4/1993 | Hodgson, Jr. | |
| 5,241,031 A | 8/1993 | Mehta | |
| 5,256,351 A | 10/1993 | Lustig et al. | |
| 5,266,392 A | 11/1993 | Land et al. | |
| 5,272,016 A | 12/1993 | Ralph | |
| 5,272,236 A * | 12/1993 | Lai et al. | 526/348.5 |
| 5,278,272 A * | 1/1994 | Lai et al. | 526/348.5 |
| 5,279,872 A | 1/1994 | Ralph | |
| 5,283,128 A | 2/1994 | Wilhoit | |
| 5,290,635 A | 3/1994 | Matsumura et al. | |
| 5,298,326 A | 3/1994 | Norpoth et al. | |
| 5,302,402 A | 4/1994 | Dudenhoeffer et al. | |
| 5,358,792 A | 10/1994 | Mehta et al. | |
| 5,374,459 A | 12/1994 | Mumpower | |
| 5,376,394 A | 12/1994 | Dudenhoeffer et al. | |
| 5,376,439 A | 12/1994 | Hodgson et al. | |
| 5,397,613 A | 3/1995 | Georgelos | |
| 5,397,640 A | 3/1995 | Georgelos et al. | |
| 5,403,668 A | 4/1995 | Wilhoit | |
| 5,427,807 A | 6/1995 | Chum et al. | |
| 5,472,791 A | 12/1995 | Landoni | |
| 5,491,019 A | 2/1996 | Kuo | |
| RE35,285 E | 6/1996 | Quacquarella et al. | |
| 5,530,065 A | 6/1996 | Farley et al. | |
| 5,562,958 A | 10/1996 | Walton et al. | |
| 5,604,043 A * | 2/1997 | Ahlgren | 428/518 |
| 5,677,383 A | 10/1997 | Chum et al. | |
| 5,707,751 A | 1/1998 | Garza et al. | |
| 5,834,077 A | 11/1998 | Babrowicz | |
| 5,852,152 A | 12/1998 | Walton et al. | |
| 6,074,715 A | 6/2000 | Lind et al. | |
| 6,270,867 B1 | 8/2001 | Eckstein et al. | |
| 6,306,969 B1 | 10/2001 | Patel et al. | |
| 6,437,064 B1 | 8/2002 | Eckstein et al. | |
| 6,511,568 B1 | 1/2003 | Eckstein et al. | |
| 6,514,583 B1 | 2/2003 | Ahlgren et al. | |
| 6,531,198 B2 | 3/2003 | Lind et al. | |
| 6,544,660 B1 | 4/2003 | Lind et al. | |
| 2003/0027008 A1 | 2/2003 | Eckstein et al. | |
| 2004/0009314 A1 | 1/2004 | Ahlgren et al. | |

FOREIGN PATENT DOCUMENTS

| | | |
|---|---|---|
| AU | 701139 | 1/1999 |
| AU | 714055 | 12/1999 |
| DE | 3035474 A1 | 4/1982 |
| EP | 0 057 238 | 8/1982 |
| EP | 0 057 891 | 8/1982 |
| EP | 0 107 854 B2 | 5/1984 |
| EP | 0 120 503 A1 | 10/1984 |
| EP | 0 051 480 | 1/1985 |
| EP | 0 141 555 A1 | 5/1985 |
| EP | 0 151 462 | 8/1985 |
| EP | 0 227 421 | 12/1986 |
| EP | 0 229 413 A1 | 7/1987 |
| EP | 0 236 099 B2 | 9/1987 |
| EP | 0 170 385 | 2/1988 |
| EP | 0 350 170 B2 | 1/1990 |
| EP | 0 360 491 A2 | 3/1990 |
| EP | 0 397 517 | 11/1990 |
| EP | 0 416 815 | 3/1991 |
| EP | 0 416 848 A1 | 3/1991 |
| EP | 0 447 035 A2 | 9/1991 |
| EP | 0 451 977 A1 | 10/1991 |
| EP | 0 452 920 | 10/1991 |
| EP | 0 461 848 | 12/1991 |
| EP | 0 217 596 B1 | 1/1992 |
| EP | 0516019 A2 | 2/1992 |
| EP | 0 495 099 | 7/1992 |
| EP | 0 562 493 | 3/1993 |
| EP | 0 552 911 B1 | 7/1993 |
| EP | 0 562 496 | 9/1993 |
| EP | 0 597 502 | 5/1994 |
| EP | 0 600 425 | 6/1994 |
| EP | 0 662 988 | 7/1995 |
| EP | 0 662 989 | 7/1995 |
| EP | 0 414 202 B1 | 11/1995 |
| EP | 0706455 B1 | 4/1996 |
| EP | 0938521 B1 | 9/1999 |
| FR | 2516017 | 10/1982 |
| GB | 1 209 825 | 10/1970 |
| GB | 2063278 | 6/1981 |
| GB | 2 097 324 | 11/1982 |
| GB | 2124240 A | 2/1984 |
| GB | 2 206 890 | 1/1989 |
| JP | 1-101315 | 4/1989 |
| JP | 3-26541 | 2/1991 |
| JP | 10-276383 | 11/1998 |
| WO | 87/03887 | 7/1987 |
| WO | 87/07880 | 12/1987 |
| WO | 90/03414 | 4/1990 |
| WO | 92/14784 | 9/1992 |
| WO | 93/09173 | 1/1993 |
| WO | 93/03093 | 2/1993 |
| WO | 93/08221 | 4/1993 |
| WO | 93/11940 | 6/1993 |
| WO | 93/12151 | 6/1993 |
| WO | 94/06857 | 3/1994 |
| WO | 94/07954 | 4/1994 |
| WO | 94/09060 | 4/1994 |
| WO | 94/18263 | 8/1994 |
| WO | 95/00333 | 1/1995 |
| WO | 95/04761 | 2/1995 |

OTHER PUBLICATIONS

May 31, 1994, Office Action in U.S. Appl. No. 08/018,657.
Nov. 30, 1994, Amendment under 37 CFR 1.111 in U.S. Appl. No. 08/018,657.
Feb. 17, 1995, Office Action in U.S. Appl. No. 08/018,657.
Jul. 14, 1995, Response under 37 CFR 1.111 in U.S. Appl. No. 08/018,657.
Nov. 2, 1995, Office Action in U.S. Appl. No. 08/018,657.
Apr. 2, 1996, Amendment under 37 CFR 1.111 in U.S. Appl. No. 08/018,657.
Aug. 15, 1996, Office Action in U.S. Appl. No. 08/018,657.
Dec. 16, 1996, Amendment under 37 CFR 1.111 in U.S. Appl. No. 08/018,657.
Jan. 31, 1997, Supplemental Amendment under 37 CFR 1.111.
Jun. 3, 1997, Office Action in U.S. Appl. No. 08/018,657.
Jan. 16, 1998, Notice of Abandonment in U.S. Appl. No. 08/018,657.
Feb. 21, 1996, Office Action in U.S. Appl. No. 08/418,926.
Mar. 12, 1996, Amendment in U.S. Appl. No. 08/418,926.
Jul. 11, 1996, Office Action in U.S. Appl. No. 08/418,926.
Sep. 16, 1996, Office Action in U.S. Appl. No. 08/481,782.
Mar. 17, 1997, Amendment under 37 CFR 1.111 in U.S. Appl. No. 08/481,782.
Mar. 17, 1997, Declaration under 37 CFR 1.132.
Sep. 17, 1997, Notice of Allowance in U.S. Appl. No. 08/481,782.
Mar. 9, 1998, Notice of Abandonment in U.S. Appl. No. 08/481,782.
Jun. 25, 1997, Office Action in U.S. Appl. No. 08/747,241.
Mar. 9, 1998, Notice of Abandonment in U.S. Appl. No. 08/747,241.
Feb. 22, 1999, Office Action in U.S. Appl. No. 08/932,946.
Aug. 18, 1999, Amendment under 37 CFR 1.111 in U.S. Appl. No. 08/932,946.
Aug. 18, 1999, Terminal Disclaimer over USPN 5604043 in U.S. Appl. No. 08/932,946.
Nov. 1, 1999, Supplemental Amendment under 37 CFR 1.111 in U.S. Appl. No. 08/932,946.
Oct. 28, 1999, Declaration under 37 CFR 1.132.
Nov. 9, 1999, Notice of Allowance, Notice of Allowability, Interview Summary, in U.S. Appl. No. 08/932,946.
Mar. 17, 2000, Notice of Abandonment in U.S. Appl. No. 08/932,946.
May 31, 2000, Notice of Rescinded Abandonment in U.S. Appl. No. 08/932,946.

Aug. 11, 2000, Office Action in U.S. Appl. No. 08/932,946.
Jan. 11, 2001, Amendment under 37 CFR 1.111 in U.S. Appl. No. 08/932,946.
Oct. 10, 2000, Interview Summary in U.S. Appl. No. 08/932,946.
Apr. 10, 2001, Office Action in U.S. Appl. No. 08/932,946 in U.S. Appl. No. 08/932,946.
Jun. 13, 2001, Preliminary Amendment in U.S. Appl. No. 08/932,946.
Jul. 6, 2001, Notice of Non-Compliant Amendment in U.S. Appl. No. 08/932,946.
Jul. 13, 2001, Corrected Preliminary Amendment in U.S. Appl. No. 08/932,946.
Sep. 27, 2001, Office Action and Interview Summary in U.S. Appl. No. 08/932,946.
Nov. 2, 2001, Amendment under 37 CFR 1.111 in U.S. Appl. No. 08/932,946.
Nov. 2, 2001, Declaration under 37 CFR 1.132.
Apr. 4, 2002, Notice of Allowance, Notice of Allowability, Reasons for Allowance in U.S. Appl. No. 08/932,946.
Sep. 9, 2002, Request for Continued Examination in U.S. Appl. No. 08/932,946.
Sep. 9, 2002, Petition under 37 CFR 1.313 in U.S. Appl. No. 08/932,946.
Sep. 19, 2002, Decision on Petition of Sep. 9.
Sep. 25, 2002, Notice of Allowance, Notice of Allowability in U.S. Appl. No. 08/932,946.
May 12, 1999, Office Action in U.S. Appl. No. 08/962,825.
Nov. 11, 1999, Amendment under 37 CFR 1.111 in U.S. Appl. No. 08/962,825.
Nov. 11, 1999, Terminal Disclaimer over U.S. Appl. No. 08/996,367 in U.S. Appl. No. 08/962,825.
Jan. 19, 2000, Interview Summary in U.S. Appl. No. 08/962,825.
Feb. 10, 2000, Supplemental Amendment under 37 CFR 1.111 in U.S. Appl. No. 08/962,825.
Feb. 9 & 24, 2000, Interview Summary in U.S. Appl. No. 08/962,825.
Feb. 29, 2000, Notice of Allowance, Notice of Allowability in U.S. Appl. No. 08/962,825.
Aug. 3, 2000, Notice of Abandonment in U.S. Appl. No. 08/962,825.
May 13, 1999, Office Action in U.S. Appl. No. 08/996,367.
Nov. 15, 1999, Amendment in U.S. Appl. No. 08/996,367.
Jan. 19, 2000, Interview Summary in U.S. Appl. No. 08/996,367.
Feb. 4, 2000, Supplemental Amendment under 37 CFR 1.111 in U.S. Appl. No. 08/996,367.
Apr. 21, 2000, Office Action in U.S. Appl. No. 08/996,367.
Oct. 10, 2000, Interview Summary in U.S. Appl. No. 08/996,367.
Oct. 23, 2000, Amendment under 37 CFR 1.111 in U.S. Appl. No. 08/996,367.
Jan. 17, 2001, Office Action in U.S. Appl. No. 08/996,367.
Jun. 18, 2001, Amendment under 37 CFR 1.111 in U.S. Appl. No. 08/996,367.
Sep. 7, 2001, Office Action in U.S. Appl. No. 08/996,367.
Feb. 6, 2002, Amendment under 37 CFR 1.116 in U.S. Appl. No. 08/996,367.
Feb. 6, 2002, Notice of Appeal in U.S. Appl. No. 08/996,367.
Mar. 27, 2002, Advisory Action in U.S. Appl. No. 08/996,367.
Aug. 2, 2002, Appeal Brief under 37 CFR 1.192 in U.S. Appl. No. 08/996,367.
Aug. 2, 2002, Supplemental Amendment under 37 CFR 1.116 in U.S. Appl. No. 08/996,367.
Sep. 3, 2002, Advisory Action in U.S. Appl. No. 08/996,367.
Nov. 5, 2002, Office Communication and Interference Initial Memorandum in U.S. Appl. No. 08/996,367.
Feb. 20, 2003, Preliminary Amendment in U.S. Appl. No. 10/370,834.
Mar. 9, 2004, Office Action in U.S. Appl. No. 10/370,834.
Aug. 9, 2004, Terminal Disclaimer over U.S. Appl. No. 09/996,367 in U.S. Appl. No. 10/370,834.
Aug. 9, 2004, Terminal Disclaimer over USPN 6,514,583 in U.S. Appl. No. 10/370,834.
Aug. 9, 2004, Amendment under 37 CFR 1.111 in U.S. Appl. No. 10/370,834.
Nov. 2, 2004, Office Action in U.S. Appl. No. 10/370,834.
Feb. 2, 2005, Terminal Disclaimer over USPN 6,514,583 in U.S. Appl. No. 10/370,834.
Feb. 2, 2005, Response under 37 CFR 1.116 in U.S. Appl. No. 10/370,834.
Feb. 22, 2005, Office Action in U.S. Appl. No. 10/370,834.
Jun. 22, 2005, Petition under 37 CFR 1.182 in U.S. Appl. No. 10/370,834.
Jun. 22, 2005, Amendment under 37 CFR 1.111 in U.S. Appl. No. 10/370,834.
Jun. 22, 2005, Terminal Disclaimer over U.S. Appl. No. 09/996,367 in U.S. Appl. No. 10/370,834.
Aug. 31, 2005, Decision on Petition in U.S. Appl. No. 10/370,834.
Sep. 21, 2005, Office Communication in U.S. Appl. No. 10/370,834.
Jun. 20, 2006, Office Action in U.S. Appl. No. 10/370,834.
Jul. 28, 2005, Amendment under 37 CFR 1.111 in U.S. Appl. No. 10/370,834.
Jan. 23, 2007, Office Action in U.S. Appl. No. 10/370,834.
Jun. 25, 2007, Amendment under 37 CFR 1.111 in U.S. Appl. No. 10/370,834.
Jun. 25, 2007, Declaration under 37 CFR 1.131 in U.S. Appl. No. 10/370,834.
Feb. 19, 2008, Office Action in U.S. Appl. No. 10/370,834.
Feb. 25, 2008, Amendment under 37 CFR 1.116 in U.S. Appl. No. 10/370,834.
Apr. 4, 2008, Notice of Allowance in U.S. Appl. No. 10/370,834.
Aug. 8, 2007, Office Action in U.S. Appl. No. 10/370,834.
Nov. 8, 2007, Amendment under 37 CFR 1.111 in U.S. Appl. No. 10/370,834.
Nov. 8, 2007, Terminal Disclaimer over USPN 6,514,583 in U.S. Appl. No. 10/370,834.
Sep. 22, 2008, Notice of Allowance in U.S. Appl. No. 10/370,834.
Dec. 22, 2008, Request for Continued Examination under 37 CFR 1.114 in U.S. Appl. No. 10/370,834.
Dec. 22, 2008, Supplemental Information Disclosure Statement in U.S. Appl. No. 10/370,834.
Mar. 20, 2009, Notice of Allowance in U.S. Appl. No. 10/370,834.
Feb. 23, 1998, Statement of Grounds and Particulars in Support of Opposition (i.e., of AU 681,116).
Nov. 23, 1998, Declaration of David John Tadgell.
Dec. 10, 1998, Declaration of David Henry Solomon.
Jun. 26, 2008, Amendments—Amending a specification.
Jun. 26, 2008, Proposed Amendments in Australian Patent Application No. 60545/94.
Jul. 23, 2003, Standard Search Report for EP file No. RS 91761DE.
Feb. 17, 1994, European Search Report for EP 93 11 9235.
Dec. 13, 1996, Communication Pursuant to Article 96(2) and Rule 51(2) EPC in EP 93 11 9235.
Jun. 23, 1997, Response to Official Communication dated Dec. 13, 1994 in EP 93 11 9235.
Dec. 5, 1997, Summons to Attend Oral Hearing in EP 93 11 9235.
Jan. 20, 1998, Preparation of Oral Proceedings.
Feb. 10, 1998, Summons to Attend Oral Proceedings.
Nov. 6, 1998, Response including New Claims (main request first auxiliary request, and second auxiliary request).
Dec. 4, 1998, Invitation Pursuant to Article 96(2) and Rule 51(2) EPC in EP 93 11 9235.
Feb. 2, 1999, Reply to Official Communication dated Dec. 4, 1998.
Apr. 20, 1999, Communication under Rule 51(4) EPC.
Aug. 23, 1999, Reply to Official Communication dated Apr. 20, 1999.
Jan. 27, 2000, Decision to Grant a European Patent Pursuant to Article 97(2) EPC.
Dec. 8, 2000, Opposition of EP-B-0 600 425 by Pechiney Plastic Packaging, Inc.
Dec. 11, 2000, Communication of a Notice of Opposition of EP-B-0 600 425 by The Dow Chemical Company.
Nov. 20, 2000, Notice of Opposition of EP-B-0 600 425 by Dr. Werner Behnisch.
May 9, 2001, Letter from Dr. N. ter Meer regarding patentability of claims filed Dec. 28, 2000.
Sep. 10, 2001, Proprietor's letter of reply to EPO of Sep. 10, 2001, regarding telephone conversations with examiner, and new claims 1-27.

Jun. 14, 2002, Proprietor's observations on the notices of opposition of Dr. Behnisch, Dow, and Pechiney.
Sep. 22-24, 1992, SPO '92, Table of Contents.
Aug. 4, 2003, Letter from Robin Geary to Duncan Curley.
Aug. 7, 2003, Pechiney response to Proprietor's comments filed Jun. 14, 2002.
Jun. 28, 2004, Summons to Attend Oral Hearing in EP Application No. 93119235.5.
Nov. 8, 2004, Brief filed by Proprietor in preparation for oral proceedings.
Nov. 8, 2004, Brief filed by Dow in preparation for oral proceedings.
Nov. 29, 2004, Dow filing of pages from dictionary and encyclopedia.
Dec. 23, 2004, Minutes of Oral Proceedings of Dec. 8, 2004 Plus claims annexes.
Jan. 3, 2005, Decision Revoking EP 0 600 425 B1.
Annexes I-IV accompanying Decision Revoking patent: Annex I: EP 0 600 425; Annex II: Main Request (Set C), Annex III: Auxiliary Request (Set E), Annex IV: $2^{nd}$ Auxiliary Request (Set M).
May 3, 2005, Proprietor's Statement of Grounds for Appeal.
Nov. 25, 2005, Dow's statement of response in reaction to the motivated statement of appeal by Patentee.
Sep. 20, 2005 Pechiney's response to proprietor's statement of grounds for appeal.
Jan. 18, 2006, Response by Dr. Behnisch to Proprietor's statement of grounds of appeal.
Apr. 18, 2008, proprietor's Reply to Official Communication dated Mar. 27, 2008 and in preparation for oral proceedings.
May 26, 2008, Minutes of Oral Proceedings of Appeal, and $2^{nd}$ Auxiliary Request (Set M).
C.J. Benning, Plastic Films for Packaging, Technology, Applications, and Economics, 1983, pp. 19-29.
Encyclopedia of Polymer Science and Engineering, vol. 10, Molecular Weight Determination to Pentadiene Polymers, John Wiley & sons, 1987, pp. 619-635.
Encyclopedia of Polymer Science and Engineering, vol. 7, Fibers, Optical to Hydrogenation, John Wiley & sons, 1987, pp. 88-105.
W. Graessley, "Effect of Long Branches on the Flow Properties of Polymers", Accounts of Chemical Research, vol. 10, pp. 332-339 (1977).
M.K. Reinking, Equistar Chemicals, LP, Presentation at SPE Polyolefins XII Conference, pp. 259-286.
Jun. 17, 2008, Decision of the Technical Board of Appeal.
Aug. 17, 2010, Communication pursuant to Article 101(1) and Rule 81(2) to (3) EPC.
Apr. 1, 1996, Communication pursuant to Article 96(2) and Rule 51(2) EPC (EP 93118403.0).
Apr. 28, 1994, European Search Report for EP Pat. Appln. No. 93118403.0.
Oct. 9, 1996, Reply to Official Communication of Apr. 1, 1996.
May 29, 1997, Communication Pursuant to Article 96(2) and rule 51(2) EPC.
Dec. 5, 1997, Reply to Official Communication dated May 29, 1997.
Apr. 6, 1999, Communication pursuant to Article 96(2) and Rule 51(2) EPC.
Oct. 6, 1999, Reply to Official Communication dated Apr. 6, 1999.
Jun. 20, 2000, Communication pursuant to Article 96(2) and Rule 51(2) EPC.
Dec. 28, 2000, Reply to Official Communication dated Jun. 20, 2000.
Sep. 10, 2001, Reply to Telephone Conversations with Examiner.
Nov. 27, 2001 Observations of third parties according to Article 115 EPC.
Oct. 31, 2001, Invitation Pursuant to Article 96(2) and Rule 51(2) EPC.
May 21, 2002, Observations of Third Parties according to Article 115 EPC.
Jun. 21, 2002, Communication under Rule 51(4) EPC.
Oct. 15, 2002, Communication pursuant to Article 96(2) EPC.
Apr. 11, 2003, Reply to Communication dated Oct. 15, 2002.
Dec. 12, 2003, Communication under Rule 51(4) EPC.

Dec. 16, 2005, Opposition of EP 0 597 502 by Gabriele Ludwig.
U.S. Appl. No. 07/961,269.
B.C. Trudell, et al, "Single Site Catalyzed Ethylene Copolymers: Structure/Property Relationships", *ANTEC 1992*, pp. 613-617.
"First 'single-site-catalyse' PEs Are for medical and cable applications", *Modern Plastics International*, Aug. 1992, p. 48.
"Biaxially Stretched in Comparison with Conventionally Blown Coextruded Composite Plastic Films", *Polymer Engineering and Science*, Mid Feb.1987, vol. 27, No. 3, pp. 225-231.
Jun. 1994, Exact Facts, Jun. 1994.
Kuroda, N., et al, "Sequence and Branching Distribution of Ethylene/ 1-Butene Copolymers Prepared with a Soluble Vanadium-Based Ziegler-Natta Catalyst", *Macromolecules*, vol. 25, No. 11, 1992.
Tominari, K., "Special Applications and markets for Ethylene alpha Olefin Copolymers in Japan", *Specialty Plastics Conference '86*, pp. 301-335 (Nov. 13-15, 1986).
Mar. 2, 2005, Decision to Grant a European Patent Pursuant to Article 97(2) EPC.
Jan. 19, 2006, Communication of a Notice of Opposition.
Nov. 23, 2006, Response to Communication under Rule 57(1).
Nov. 23, 2006, Response to Opposition of EP 0 597 502 by Cryovac, Inc.
Jul. 2, 2007, Summons to Attend Oral Proceedings pursuant to Rule 71(1) EPC.
Jun. 28, 2007, Provision of the minutes in accordance with Rule 76(4) EPC.
Aug. 2, 2007, Written Submissions filed on behalf of Dow, in preparation for Oral Proceedings.
Oct. 2, 2007, Written Submissions filed in Advance of Oral Proceedings for EP 0 597 502.
Nov. 5, 2007, Minutes of Proceedings before Opp. Div. For EP 0 597 502.
Nov. 5, 2007, Decision Revoking EP 0 597 502.
"Exact Linear Ethylene Polymers for Enhanced Sealing Performance", D. Van Der Sanden and R. W. Halle, Antec '92, pp. 154-158.
"A New Family of Liner Ethylene Polymers Provides Enhanced Sealing Performance", R.W. Halle and D. Van Der Sanden, Feb. 1992, Tappi Journal, pp. 99-103.
"PW Technology Watch", B. Miller, Plastics World, Nov. 1991, p. 29.
"Polyolefins Gain Higher Performance from New Catalyst Technologies", R. Leaversch, Modern Plastics, Oct. 1991, pp. 46-49.
"Exxon Cites Breakthrough in Olefins Polymerization", Modern Plastics, Jul. 1991, pp. 61-62.
"New Polyolefin Resins Emerge; Branched Linear Copolymers", Modern Plastics International, Nov. 1992, pp. 16-18.
"Enter a New Generation of Polyolefins", Plastics Technology, Nov. 1991, pp. 15-17.
"Novel Rheological Behavior Claimed for New-Tech Polyolefins", Plastics Technology, Nov. 1992, pp. 23-25.
"Dow's Patent on Elastic Substantially Linear Olefin Polymers", The Metallocene Monitor, 1993, pp. 2-6.
"Determination of Branching Distributions in Polyethyene and Ethylene Copolymrs", Wild et al, Journal of Polymer Science, vol. 0, 1982, pp. 441-455.
RD&E Development Order Form, Film Type LDX-3204.
Duncan Customer Service Form, H.E. Butt Grocery, Product #9W947.
Homogeneous Catalysis, Industrial Applications and Implications:, American Chemical Society, 1968, R. Gould, Editor.
"A New Family of Linear Ethylene Polymers with Enhanced Sealing Performance", D. Van Der Sanden and R.W. Halle, 1991 Polymers Laminations & Coatings Conference, pp. 289-291.
"Ethylene Polymers", Encyclopedia of Polymer Science and Engineering, Second Edition, vol. 6, pp. 420-423.
"Single Site Metallocene Catalysts Yield Tailor Made Polyolefin Resins", Don Schwank, Modern Plastics International, Aug. 1993, pp. 40-41.
"Sequence and Branching Distribution . . . ", 1993, vol. 25, pp. 2820-2827, Macromolecules.
Sherman, "Impact: Which Test to Use? Which Instrument to Buy?" Plastics Technology "PTonline.com", 2001.

* cited by examiner

HEAT SHRINKABLE FILMS CONTAINING SINGLE SITE CATALYZED COPOLYMERS HAVING LONG CHAIN BRANCHING

This application is a continuation of U.S. Ser. No. 08/962,825, filed Nov. 3, 1997, now abandoned, which is a continuation of U.S. Ser. No. 08/018,657, filed Feb. 17, 1993, now abandoned, which is a continuation-in-part of U.S. Ser. No. 07/983,017, filed Nov. 30, 1992, now abandoned, which is a continuation-in-part of U.S. Ser. No. 07/976,122, filed Nov. 13, 1992, now abandoned.

FIELD OF THE INVENTION

The present invention is generally directed to heat shrinkable films containing single site catalyzed copolymers which include at least some long chain branching.

BACKGROUND OF THE INVENTION

Shrinkable thermoplastic films have found many useful applications in packaging of meats, cheeses, poultry and numerous other food and non-food products. There is always the search for improvement in these films to make them have better impact resistance, improved optics and improved shrinkability. For example, in U.S. Pat. No. 4,640,856 to Ferguson et al., the multilayer thermoplastic heat shrinkable film was described having improved shrink, toughness and barrier properties. The film included at least one layer of a very low density polyethylene and a gas barrier layer of vinylidene chloride copolymer or ethylene vinyl alcohol. The film was found to be particularly useful for making bags for packaging large cuts of fresh red meat.

U.S. Pat. Nos. 5,059,481, 4,976,898 and 4,863,769, all to Lustig et al., disclose heat shrinkable film suitable for packaging food articles such as frozen poultry, primal meat cuts and processed meat products wherein the film may be a biaxially stretched monolayer film of a very low density polyethylene copolymer or a multilayer film containing very low density polyethylene.

U.S. Pat. No. 4,457,960 to Newsome discloses the use of linear low density polyethylene in multiple layer molecularly oriented films.

Each of the foregoing patents describe the incorporation into heat shrinkable films of conventional ethylene/alpha-olefins produced by Ziegler-Natta catalyst systems. Ziegler-Natta catalytic methods are commonly used throughout the polymer industry and have a long history tracing back to about 1957.

These systems are often referred to as heterogeneous since they are composed of many types of catalytic species each at different metal oxidation states and different coordination environments with ligands. Examples of Ziegler-Natta heterogeneous systems include metal halides activated by an organometallic co-catalyst, such as titanium or magnesium chlorides complexed to trialkyl aluminum and may be found in patents such as U.S. Pat. Nos. 4,302,565 and 4,302,566. Because these systems contain more than one catalytic species, they possess polymerization sites with different activities and varying abilities to incorporate comonomer into a polymer chain.

The result of such multi-site chemistry is a product with poor control of the polymer chain architecture both within the sequence of a single chain, as well as when compared to a neighboring chain. In addition, differences in catalyst efficiency produce high molecular weight polymer at some sites and low molecular weight at others. Therefore, copolymers produced using these systems lead to polymer products which are mixtures of chains some high in comonomer and others with almost none. For example, conventional Ziegler-Natta multi-site catalysts may yield a linear ethylene/alpha-olefin copolymer (HDPE, LLDPE, VLDPE, ULDPE) having a mean comonomer percentage of 10, but with a range of 0% to 40% comonomer in individual chains. This, together with the diversity of chain lengths results in a truly heterogeneous mixture also having a broad molecular weight distribution (MWD).

Linear low density polyethylene (LLDPE) has enjoyed great success as a raw material choice for packaging films. The term LLDPE is generally understood to describe copolymers of ethylene and one or more other alpha olefin monomers which are polymerized at low pressure using a Ziegler-Natta catalyst to achieve a density range of about 0.915 to about 0.940. Although no clear standard exists, LLDPE polymers are often marketed in subgroups of densities such as linear medium density (LMDPE), linear low density polyethylene, linear very low density (VLDPE), or linear ultra low density polyethylene (ULDPE). These classifications are for marketing use and will vary by supplier.

These materials are different from high pressure low density polyethylene (LDPE) which is generally understood in the trade as a highly branched homopolymer having a single low melting point. For example, a 0.92 density LDPE would typically have a melting point at about 112 C while a corresponding density LLDPE would have melting points at 107, 120, and 125 C. The multiple melting points are commonly observed with LLDPE and are a consequence of the above mentioned heterogeneous incorporation of comonomer.

Recently a new type of ethylene copolymer has been introduced which is the result of a new catalyst technology. Examples of introductory journal articles include "Exxon Cites 'Breakthrough' in Olefins Polymerization," Modern Plastics, July 1991, p. 61; "Polyolefins Gain Higher Performance from New Catalyst Technologies," Modern Plastics, October 1991, p. 46; "PW Technology Watch," Plastics World, November 1991, p. 29; and "," Plastics Technology, November 1991, p. 15.

Such new resins are produced using metallocene catalyst systems, the uniqueness of which resides in the steric and electronic equivalence of each catalyst position. Metallocene catalysts are characterized as having a single, stable chemical type rather than a volatile mixture of states as discussed for conventional Ziegler-Natta. This results in a system composed of catalyst positions which have a singular activity and selectivity. For this reason, metallocene catalyst systems are often referred to as "single site" owing to the homogeneous nature of them, and polymers and copolymers produced from them are often referred to as single site resins by their suppliers.

Generally speaking, metallocene catalysts are organometallic compounds containing one or more cyclopentadienyl ligands attached to metals such as hafnium, titanium, vanadium, or zirconium. A co-catalyst, such as but not limited to, oligomeric methyl alumoxane is often used to promote the catalytic activity. By varying the metal component and the cyclopentadienyl ligand a diversity of polymer products may be tailored having molecular weights ranging from about 200 to greater than 1,000,000 and molecular weight distributions from 1.5 to about 15. The choice of co-catalyst influences the efficiency and thus the production rate, yield, and cost. Examples of metallocene catalysts are disclosed in U.S. Pat. Nos. 4,701,432, 4,306,041, 5,088,228, 4,935,397, 5,084,534, 3,161,629, 5,055,438, 5,057,475, and in JP 63/175004 and JP 1,101,315.

As a consequence of the single site system afforded by metallocenes, ethylene/alpha-olefin copolymer resins can be produced with each polymer chain having virtually the same architecture. Therefore, the copolymer chains produced from single site systems are uniform not only in chain length, but also in average comonomer content, and even regularity of comonomer spacing, or incorporation along the chain. In contrast to the above mentioned Ziegler-Natta polymers, these single site metallocene polymers are characterized as having a narrow MWD and narrow compositional distribution (CD). While conventional polymers have MWD's of about 3.5 to 8.0, metallocenes range in MWD from about 1.5 to about 2.5 and most typically about 2.0. MWD refers to the breadth of the distribution of molecular weights of the polymer chains, and is a value which is obtained by dividing the number-average molecular weight into the weight-average molecular weight. The low CD, or regularity of side branch chains along a single chain and its parity in the distribution and length of all other chains, greatly reduces the low MW and high MW "tails". These features reduce the extractables which arise from poor LMW control as well as improve the optics by removing the linear, ethylene-rich portions which are present in conventional heterogeneous resins.

Thus, conventional Ziegler-Natta systems produce heterogeneous resins which reflect the differential character of their multiple catalyst sites while metallocene systems yield homogeneous resins which, in turn, reflect the character of their single catalytic site.

Another distinguishing property of single site catalyzed ethylene copolymers is manifested in their melting point range. The narrow CD of metallocenes produces a narrow melting point range as well as a lower Differential Scanning calorimeter (DSC) peak melting point peak. Unlike conventional resins which retain a high melting point over a wide density range, metallocene resin melting point is directly related to density. For example, an ethylene/butene copolymer having a density of 0.905 g/cc produced using a metallocene catalyst has a peak melting point of about 100 C, while a slightly lower density ethylene/butene copolymer which was made using a conventional Ziegler catalyst reflects its heterogeneous nature with a melting point at about 120 C. DSC shows that the Ziegler resin is associated with a much wider melting point range and actually melts higher despite its lower density.

It should be noted that at least some previously available ethylene based linear polymers approximated the physical and compositional properties achieved by the present metallocene catalyzed polyolefins. For example, in "Sequence and Branching Distribution of Ethylene/1-Butene Copolymers Prepared with a Soluble Vanadium Based Ziegler-Natta Catalyst," Macromolecules, 1992, 25, 2820-2827, it was confirmed that a soluble vanadium based Ziegler-Natta catalytic system VOCl/Al(CH)Cl, acts essentially as a single site catalyst although VOCl is not a metallocene. Homogeneous copolymers produced by such a catalyst system have been commercially available for several years. An example of such are the resins sold under the tradename Tafmer™ by Mitsui.

U.S. Pat. No. 4,501,634 to Yoshimura et al is directed to an oriented, multilayered film which includes a Tafmer as a blend component in at least one layer.

Japanese Kokoku 37907/83 to Gunze Limited was directed to a heat-sealable biaxially oriented composite film wherein the heat seal layer contains Tafmer in a blend.

The foregoing patents disclose homogeneous ethylene alpha-olefins having densities below 0.90 g/cc. Heretofore, such resins have been generally unavailable in densities at and above 0.90 g/cc because of limitations in the VOCl process.

Yet, U.S. Pat. No. 1,209,825 to DuPont discloses homogeneous copolymers having densities up to about 0.920 made with single site Ziegler catalysts. When extruded into a film the resins exhibit improved physical and optical properties as compared to films of heterogeneous copolymers. However, such homogeneous copolymers of densities above 0.90 g/cc have been commercially unavailable. It is believed that process limitations precluded the manufacture of such resins in any but bench-top quantities. Metallocene catalysts, however, can provide such homogeneous copolymers in a wide range of densities in commercial quantities. Thus, the benefits of homogeneity can now be incorporated into copolymers having densities analogous to those of conventional VLDPEs and LLDPEs.

However, while providing improved physical properties such as optics, low extractables and improved impact, the narrow compositional distribution of some typical metallocene catalyzed resins can cause some processing difficulties. It has been found that such processing problems are avoided if some limited long chain branching is introduced. That is, a typical metallocene catalyzed ethylene alpha-olefin may be thought of as a collection of linear chains, each of substantially identical length, each having approximately the same number of short chain (comonomer) branches distributed at regular intervals along that length. Splicing an abbreviated linear chain with the same regular comonomer distribution onto each of the linear chains, or at least some of the chains in the collection, yields an ethylene alpha-olefin with essentially all of the physical properties of the original copolymer, but with an improved "body" or melt strength for improved processability including improved extrudability, orientation speeds and susceptibility to irradiation.

Dow in EP 416,815 disclosed the preparation of ethylene/olefin copolymers using monocyclopentadienylsilane complexed to a transition metal. The homogeneous ethylene copolymers which may be prepared using this catalyst are said to have better optical properties than typical ethylene polymers and be well suited for film or injection molding.

As will be shown below, it has been found that resins produced by the Dow process exhibit improved physical properties characteristic of single site catalyzed resins but also possess a processability similar to that of conventional Ziegler-Natta copolymers. It is believed that the Dow metallocene resins possess the limited long chain branching discussed above.

It is thus an object of the present invention to provide a film structure having improved physical properties such as improved optics and impact strength and low extractables.

It is a further object of the present invention to provide a film which is readily extruded and processed.

SUMMARY OF THE INVENTION

These as well as other objects are achieved by providing a film which includes a homogeneous single site catalyzed copolymer of ethylene and an alpha-olefin having from three to ten carbon atoms, wherein the single site catalyzed copolymer includes some long chain branching. Preferably, the single site catalyzed copolymer is a copolymer of ethylene and an alpha-olefin having from four to eight carbon atoms, and preferably the single site catalyzed copolymer has a density of from about 0.86 to 0.95 g/cc.

DETAILED DESCRIPTION OF THE PREFERRED EMBODIMENTS

The present invention is directed to a heat-shrinkable, thermoplastic film or bag containing a homogeneous copolymer of ethylene and at least one other alpha-olefin wherein the copolymer contains at least some limited long chain branching. The term "copolymer" as used herein is intended to denote polymers of two or more comonomers. Therefore, although the present specification generally discusses ethylene alpha-olefin copolymers such term is intended to encompass copolymers of ethylene with one or more alpha-olefins or ethylene with an alpha-olefin and another comonomer.

The term "oriented" is used herein interchangeably with the term "heat shrinkable," these terms designating a material which has been stretched and set by cooling while substantially retaining its stretched dimensions. An oriented (i.e. heat shrinkable) material will tend to return to its original unstretched (unextended) dimensions when heated to an appropriate elevated temperature.

The film of the present invention is preferably oriented and is formed by extrusion processes especially art-known coextrusion methods. It is initially cooled to a solid state by, for example, cascading water or chilled air quenching, after which it is reheated to within its orientation temperature range and oriented by stretching. The stretching to orient may be accomplished in many ways such as, for example, by "blown bubble" techniques or "tenter framing." These processes are well known to those skilled in the art and refer to orientation procedures whereby the material is heated to its softening temperature and then stretched in the cross or transverse direction (TD) and/or in the longitudinal or machine direction (MD). After being heated and stretched, the film is quickly quenched while substantially retaining its stretched dimensions to cool the film rapidly and thus set or lock in the oriented molecular configuration.

The film layers may be formed by coextrusion, with additional layers thereafter being extrusion coated thereon to form multilayer films. Two multilayer tubes may also be formed with one of the tubes thereafter being extrusion coated or laminated onto the other. The extrusion coating method of film formation is preferable to coextruding the entire film when it is desired to subject one or more layers of the film to a treatment which may be harmful to one or more of the other layers. This may be done where it is desired to irradiate one or more layers of a film with high energy electrons where the film contains a barrier layer of one or more copolymers of vinylidene chloride (e.g., Saran™), such as vinylidene chloride and vinyl chloride or vinylidene chloride and methyl acrylate as well as vinylidene chloride with ethyl acrylate or acrylonitrile.

Films of this type would, for example, comprise those where the barrier layer is a Saran™ layer in addition to or instead of an EVOH layer. Those skilled in the art generally recognize that irradiation with high energy electrons is generally harmful to such Saran™ barrier layer compositions, as irradiation may degrade and discolor Saran™, making it turn brown. Thus, if full coextrusion followed by high energy electron irradiation of the multilayer structure is carried out on a film having a barrier layer containing a Saran™ layer, the irradiation should be conducted at low levels and with care. Alternatively, this may be avoided by extruding a first layer or layers, subjecting the layer or layers to high energy electron irradiation and thereafter applying the Saran™ barrier layer and, for that matter, other layers (which may or may not have been irradiated) sequentially onto the outer surface of the extruded, previously irradiated, tube. This sequence allows for high energy electron irradiation of the first layer or layers without subjecting the Saran™ barrier layer to harmful discoloration.

Thus, as used herein the term "extrusion" or the term "extruding" is intended to include coextrusion, extrusion coating, or combinations thereof.

As noted, the present heat shrinkable film may optionally be subjected to an energetic radiation treatment, including, but not limited to corona discharge, plasma, flame, ultraviolet, and high energy electron treatment. Irradiation is most preferably performed prior to orientation and, in the case of a Saran-containing barrier structure, prior to extrusion coating of the barrier component. Radiation dosages are referred to herein in terms of the radiation unit "RAD," with one million RADS or a megarad being designated as "MR." A suitable radiation dosage of high energy electrons is in the range of up to about 12 MR, more preferably about 2 to about 9 MR. However, irradiation after orientation, regardless of structure, and performed at lower dosage levels, is also within the scope of the present invention.

For those embodiments in which the present heat shrinkable film is a multilayer film, each layer will generally serve some function or provide some characteristic to the overall structure. Seal layer composition will be chosen for ease of heat sealing and, depending on the intended end use application, other factors such as grease resistance may be of importance. Outer layer composition may be chosen for abuse resistance or, where a given end use application requires a folded over "lap" seal, sealability to the seal layer. If a barrier layer is required it will be chosen for the degree of gas or moisture impermeability needed for the ultimate product to be packaged. Further internal layers may serve to add bulk to the film, promote shrinkability, promote interlayer adhesion or any combination of these properties.

The following examples are representative of the preferred embodiments of the present films containing homogeneous branched ethylene alpha-olefin copolymers. In order to evaluate such films the following tests were employed:

Tensile Strength: A measure of the force required under constant elongation to break a specimen of the film; measured by ASTM D 882.

Elongation: A measure of the percent extension required to break a specimen of the film; measured by ASTM D 882.

Modulus: The ratio of the change in force to the change in elongation in the straight line portion of an Instron Tensile Testing curve; measured by ASTM D 882-Method A.

Tear Propagation The force required to propagate a tear from a tiny slit made by a sharp blade in a specimen of the film; measured by ASTM D 1938.

Free Shrink The percent dimensional change in a 10 cm.×10 cm. specimen of film when subjected to a selected heat; measured by ASTM D 2732.

Ball Burst: The energy necessary to burst and penetrate a restrained specimen of film; measured by ASTM D 3420.

Instrumented Impact: The energy necessary to puncture a restrained specimen of film, similar to ball burst, defined above. However, the Instrumented Impact Tester has the ability to measure the tensile/elongation curve to break. The "gradient" is the ratio of the change in force to change in elongation in the straight line portion of the curve. "Peak" is a measure of the maximum force exerted on the specimen to impart rupture. "Impact Energy" is a measure of the energy absorbed by the sample prior to rupture. Instrumented Impact is measured by ASTM D 3763.

Haze: The percentage of transmitted light which is scattered forward while passing through a specimen; measured by ASTM D 1003—Method A.

Clarity: A measure of the distortion of an image viewed through a specimen; measured by ASTM D 1746.

Gloss: The surface reflectance or shine of a specimen; measured by ASTM D 2457.

Parallel Plate: A bag is confined between two plates a specified distance apart and is inflated until its seal fails. The pressure level inside the bag at the point of failure is a measure of seal quality. Results are reported in inches of water pressure (IOWP).

LRHB (Linear Ramped Hot Burst): A clean sealed bag is inflated to a specified dwell pressure and the seal area is submerged in hot water at 182 F. After five seconds the pressure inside the bag is increased at the rate of 2 inches of water/second. The time to failure and burst pressure is a measure of seal quality. Test results are reported in seconds and inches of water pressure (IOWP).

LRHB-G (Linear Ramped Hot Burst—Grease): The procedure is the same as the LRHB test described above except peanut oil is first applied to the seal area.

VPHB (Variable Pressure Hot Burst): As with the LRHB test described above, a clean sealed bag is inflated to a specified dwell pressure and the seal area is submerged in hot water at 182 F. After five seconds the pressure inside the bag is increased at a specified rate ranging from 1 to 7 inches of water/second. Here again, test results are reported as seconds and inches of water pressure (IOWP).

VPHB-G (Variable Pressure Hot Burst—Grease): The procedure is the same as the VPHB test described above except peanut oil is first applied to the seal area.

Gel: A measure of the relative amount of ultra high molecular weight polymer present in a sample. A gel measurement can provide an indication of the level of crosslinking which is present in a sample since the amount of polymer which is collected as gel increases with crosslinking. Gel is determined by solvent extraction with boiling toluene. In this method a specimen weighting 0.4 grams is extracted for 21 hours in a cellulose thimble, removed, dried and reweighed. The percentage of gel is calculated by rationing the polymer remaining (toluene insoluble fraction) to the original weight. However, a gel value of 0% carrot reliably indicate that no crosslinking has occurred. Rather, the level of crosslinking may not be great enough to provide measurable gel.

DSC: The differential scanning calorimeter (DSC) is an instrument which measures the heat flow to a polymer sample during the programmed heating of it at 10 C per minute. The trace obtained from the DSC can be used to characterize a sample's starting and ending melting point as well as its peak melting point(s).

Polydispersity (Mw/Mn): A measure of the uniformity of chain lengths within a polymer sample. It defines the breadth of molecular weight distribution. It is obtained by dividing the weight average molecular weight (Mw) by the number average molecular weight (Mn). The Mw and Mn are determined by Gel Permeation Liquid Chromatography.

Example 1

A two layer coextruded precursor film having the structure inner layer/outermost layer was formed. The inner layer was a blend of 90% by weight of NA 295-000, a 6.7% vinyl acetate EVA supplied by Quantum, and 10% by weight of Dowlex 2045. The outermost layer was a blend of 85% by weight of XUR-1567-48562-B9, a homogeneous ethylene octene copolymer having a density of 0.904 g/cc and a 1.0 MI with limited long chain branching sold on a developmental basis by DOW, and 15% by weight of EA 719-009, an ethylene butyl-acrylate copolymer having 18.5% by weight butyl-acrylate supplied by Quantum. Following irradiation, the precursor film was extrusion coated with a barrier layer of a vinylidene chloride methyl acrylate from Dow and an outer abuse layer of a blend of 92.5% by weight of LD 318.92 from Exxon, a 9% vinyl acetate EVA and 7.5% by weight of Dowlex 2045.

The resultant four layer film was then oriented by a trapped bubble method out of hot water.

Example 2

The procedure set forth in Example 1 was repeated with the exception that the outermost layer of the precursor film was 85% by weight of XUR-1567-48562-B9 from Dow and 15% by weight of Nucrel 1202HC, an ethylene methacrylic acid supplied by DuPont.

Example 3

The procedure set forth in Example 1 was repeated with the exception that the outermost layer of the precursor film was 85% by weight of XUR-1567-48562-B9 from Dow and 15% by weight of Bynel CXA 3101, an anhydride grafted EVA having 18.4% vinyl acetate supplied by DuPont.

Example 4

The procedure set forth in Example 1 was repeated with the exception that the outermost layer of the precursor film was 85% by weight of XUR-1567-48562-B9 from Dow and 15% by weight of LD 318.92 from Exxon, a 9% vinyl acetate EVA.

Example 5

For comparative purposes, the procedure set forth in Example 1 was repeated with the exception that the outermost layer of the precursor film was 85% by weight of Dowlex 2045 and 15% by weight of EA 719-009 an 18.5% butyl acrylate EBA.

Examples 6-10

The oriented multilayer films of Examples 1-5 were tested for instrumented impact, free shrink and "peel", a measure of bond strength between the outermost layer of the precursor film and the barrier layer which has been extrusion coated onto it. The results are given below in Table I. The instrumented impact and T peel numbers for the films of Examples 1-4 compare favorably to those of comparative Example 5. The free shrink of the films embodying the present invention are superior to those of the prior art structure. It should be noted that the numbers given for comparative Example 5 are representative for a series of production runs.

TABLE I

| Ex. # | Film of | Instrumented Peak (lbs) | Impact Enemy (ft) | Free Shrink L & T | T Peel lbs/in |
|---|---|---|---|---|---|
| 6 | 1 | 51.0 | 2.35 | 73 | 0.143 |
| 7 | 2 | 55.7 | 2.62 | 73 | 0.157 |
| 8 | 3 | 49.3 | 2.32 | 75 | 0.214 |
| 9 | 4 | 54.0 | 2.70 | 71 | 0.133 |
| 10 | 5 | 51.3 | 2.20 | 49.9 | 0.180 |

Example 11-19

The films of Examples 11-19 each are formed of a precursor film having an inner layer of 90% NA 295-000, a 6.7% EVA supplied by Quantum and 10% Dowlex 2045, a core layer and an outermost adhesive layer of EP 4062-3, a 15% vinyl acetate EVA supplied by DuPont. Following irradiation at a selected dosage the precursor film is extrusion coated with a barrier layer of a vinylidene chloride methyl acrylate from Dow and an outer abuse layer of 92.5% LD 318.92 and 7.5% Dowlex 2045.

Thereafter the total structure was oriented out of hot water by a trapped bubble technique with constant orientation preheat and hot bath temperatures of 195° F.

The core layer composition and irradiation dosage for each structure are given below in Table II. Also shown are orientation speeds. It should be noted that for the films of Examples 11-16, orientation speed increases with increasing irradiation dosage, whereas such relationship is not seen for comparative Examples 17-19.

The resins employed in the core layer are XUR-1567-48562-B9, a homogeneous ethylene octene copolymer having a density of 0.904 g/cc and a 1.0 MI with limited long chain branching supplied by Dow represented by B9 (below), XUR-1567-48562-B4, a homogeneous ethylene octene copolymer having a density of 0.909 g/cc and a 1.0 MI with limited long chain branching supplied by Dow represented by B4 below, and Attane 4203, a heterogeneous ethylene octene copolymer with a density of 0.905 g/cc supplied by Dow represented by 4203.

The film structure and target percent thickness per layer for each film was:

| Inner/Core/Adhesive//Barier/Abuse | | | | |
|---|---|---|---|---|
| 11.9 | 49.6 | 6.0 | 8.7 | 23.8 |

TABLE II

| Ex. # | Core | Dosage MR | Orientation Speed feet/min. |
|---|---|---|---|
| 11 | B9 | 2 | 46 |
| 12 | B9 | 4 | 53 |
| 13 | B9 | 6 | 53 |
| 14 | B4 | 2 | 40 |
| 15 | B4 | 4 | 46 |
| 16 | B4 | 6 | 51 |
| 17 | 4203 | 2 | 46 |
| 18 | 4203 | 4 | 46 |
| 19 | 4203 | 6 | 46 |

Example 20-28

The oriented multiplayer films of Examples 11-19 were tested for instrumented impact and free shrink. The results are given below in Table III. The films of Examples 11-16 compare favorably in all values to those of comparative Examples 17-19.

TABLE III

| Ex. | Film of | Instrumented Peak (lbs) | Impact Energy (ft.lbs) | Free Shrink L & T |
|---|---|---|---|---|
| 20 | 11 | 59.6 | 3.45 | 72 |
| 21 | 12 | 59.9 | 3.08 | 71 |
| 22 | 13 | 61.5 | 3.17 | 74 |
| 23 | 14 | 63.0 | 3.36 | 68 |
| 24 | 15 | 60.4 | 2.96 | 67 |
| 25 | 16 | 64.6 | 3.39 | 69 |
| 26 | 17 | 52.8 | 2.83 | 76 |

TABLE III-continued

| Ex. | Film of | Instrumented Peak (lbs) | Impact Energy (ft.lbs) | Free Shrink L & T |
|---|---|---|---|---|
| 27 | 18 | 55.3 | 2.87 | 74 |
| 28 | 19 | 56.7 | 3.01 | 77 |

Examples 29-82

Six different ethylene/alpha-olefin reins were pressed into monolayer platens, irradiated at varying dosage levels and oriented. The procedure involved placing approximately 30 ml of resin pellets in the center of the mylar sheets of a press assembly. The assembly was held at 320° F. for 1 minute without applied pressure. At 30 and 45 seconds the top press plate was lowered as close as possible without applying pressure. The pressure was then increased to 500 psi and was maintained for 1 minute. The mylar sheets with the platen sandwiched therebetween were removed from the hot steel plates to allow the plates to cool to ambient temperature. The thickness of the platen was measured at several sites and ranged from 15-18 mils.

The platen was then oriented on the T.M Long Stretcher laboratory orientation unit at the University of Tennessee, Knoxville, Tenn. The orientation conditions were as follows: stretch ratio=2.7×3.7; strain ratio=3000%×4500%; dwell time=30 sec.

The six resins employed were XUR-1567-48562-6 C, a homogeneous ethylene octane copolymer having a density of 0.915 g/cc and a 10 MI with limited long chain branching, sold on a developmental basis by Dow, represented by 6 C in Table IV below, XUR-1567-48562-6D, a homogeneous ethylene octane copolymer having a density of 0.905 g/cc and a 1.0 MI with limited long chain branching, sold on a developmental basis by Dow and represented by 6D below; XUR-1567-48562-6E, a homogeneous ethylene octane copolymer having a density of 0.895 g/cc and 1 1.0 MI with limited long chain branching, sold on a developmental basis by Dow and represented by yE below; Dowlex 2045 represented by 2045 below; Attane 4203 represented by 4203 below; and xU61512.21, a heterogeneous ethylene octane copolymer having a density of 0.902 g/cc and a 1.0 MI sold by Dow on a developmental basis, represented by 21 below.

TABLE IV

| Ex # | Resin | MR | Orientation Temperature | % Gel |
|---|---|---|---|---|
| 29 | 6C | 0 | 100 | 0 |
| 30 | 6C | 0 | 95 | 0 |
| 31 | 6C | 0 | 80 | 0 |
| 32 | 6C | 0 | 100 | 0 |
| 33 | 6c | 3 | 95 | |
| 34 | 6C | 4.5 | 100 | 18 |
| 35 | 6C | 4.5 | 95 | |
| 36 | 6C | 7 | 100 | 50 |
| 37 | 6C | 7 | 95 | |
| 38 | 6D | 0 | 95 | 0 |
| 39 | 6D | 0 | 90 | 0 |
| 40 | 6D | 0 | 75 | 0 |
| 41 | 6D | 3 | 95 | 0 |
| 42 | 6D | 3 | 90 | |
| 43 | 5D | 4.5 | 95 | 18 |
| 44 | 6D | 4.5 | 90 | |
| 45 | 6D | 7 | 95 | 50 |
| 46 | 6D | 7 | 90 | |
| 47 | 6E | 0 | 90 | 0 |
| 48 | 6E | 0 | 85 | 0 |

TABLE IV-continued

| Ex # | Resin | MR | Orientation Temperature | % Gel |
|---|---|---|---|---|
| 49 | 6E | 0 | 75 | 0 |
| 50 | 6E | 0 | 75 | 0 |
| 51 | 6E | 0 | 65 | 0 |
| 51 | 6E | 3 | 90 | 0 |
| 52 | 6E | 3 | 85 | |
| 53 | 6E | 4.5 | 90 | 18 |
| 54 | 6E | 4.5 | 85 | |
| 55 | 6E | 7 | 90 | 54 |
| 56 | 6E | 7 | 85 | |
| 57 | 2045 | 0 | 100 | 0 |
| 58 | 2045 | 0 | 95 | |
| 59 | 2045 | 3 | 100 | 0 |
| 60 | 2045 | 3 | 95 | |
| 61 | 2045 | 4.5 | 100 | 12 |
| 62 | 2045 | 4.5 | 95 | |
| 63 | 2045 | 7 | 100 | 42 |
| 64 | 2045 | 7 | 95 | |
| 65 | 4203 | 0 | 95 | 0 |
| 66 | 4203 | 0 | 90 | |
| 67 | 4203 | 3 | 95 | 0 |
| 68 | 4203 | 3 | 90 | |
| 69 | 4203 | 4.5 | 95 | 13 |
| 70 | 4203 | 4.5 | 90 | |
| 71 | 4203 | 7 | 95 | 42 |
| 72 | 4203 | 7 | 90 | |
| 73 | 21 | 0 | 90 | 0 |
| 74 | 21 | 0 | 85 | |
| 75 | 21 | 0 | 75 | |
| 76 | 21 | 0 | 65 | |
| 77 | 21 | 3 | 90 | 0 |
| 78 | 21 | 3 | 85 | |
| 79 | 21 | 4.5 | 90 | 5.6 |
| 80 | 21 | 4.5 | 85 | |
| 81 | 21 | 7 | 90 | 31 |
| 82 | 21 | 7 | 85 | |

The foregoing description of preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiment were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A film suitable for packaging comprising a homogeneous single site catalyzed copolymer of ethylene and an alpha-olefin having from three to then carbon atoms, said single site catalyzed copolymer having long chain branching, wherein said film is a multilayer film and is heat shrinkable, wherein the multilayer film has an impact energy of from 2.32 to 3.45 ft-lbs.

2. A film suitable for packaging comprising a homogeneous single site catalyzed copolymer of ethylene and an alpha-olefin having from three to then carbon atoms, said single site catalyzed copolymer having long chain branching, wherein said film is a multilayer film and is heat shrinkable, wherein the multilayer film has an impact energy of at least 3.08 ft-lbs.

3. A film suitable for packaging comprising a homogeneous single site catalyzed copolymer of ethylene and an alpha-olefin having from three to then carbon atoms, said single site catalyzed copolymer having long chain branching, wherein said film is a multilayer film and is heat shrinkable, wherein the film comprises:
 (A) a first layer comprising ethylene/vinyl acetate copolymer;
 (B) a second layer comprising a blend of homogeneous/ethylene octene copolymer having long chain branching, and ethylene/butyl acrylate copolymer;
 (C) a third layer comprising vinylidene chloride/methyl acrylate copolymer; and
 (D) a fourth layer comprising a blend of ethylene/vinyl acetate copolymer and linear low density polyethylene.

4. A film suitable for packaging comprising a homogeneous single site catalyzed copolymer of ethylene and an alpha-olefin having from three to then carbon atoms, said single site catalyzed copolymer having long chain branching, wherein said film is a multilayer film and is heat shrinkable, wherein the film comprises:
 (A) a first layer comprising ethylene/vinyl acetate copolymer;
 (B) a second layer comprising a blend of homogeneous ethylene octene copolymer having long chain branching and ethylene/methacrylic acid copolymer;
 (C) a third layer comprising vinylidene chloride/methyl acrylate copolymer; and
 (D) a fourth layer comprising a blend of ethylene/vinyl acetate copolymer and linear low density polyethylene.

5. A film suitable for packaging comprising a homogeneous single site catalyzed copolymer of ethylene and an alpha-olefin having from three to then carbon atoms, said single site catalyzed copolymer having long chain branching, wherein said film is a multilayer film and is heat shrinkable, wherein the film comprises:
 (A) a first layer comprising ethylene/vinyl acetate copolymer;
 (B) a second layer comprising a blend of homogeneous ethylene/octene copolymer having long chain branching and anhydride grafted ethylene/vinyl acetate copolymer;
 (C) a third layer comprising vinylidene chloride/methyl acrylate copolymer;
 (D) a fourth layer comprising a blend of ethylene/vinyl acetate copolymer and linear low density polyethylene.

6. A film suitable for packaging comprising a homogeneous single site catalyzed copolymer of ethylene and an alpha-olefin having from three to then carbon atoms, said single site catalyzed copolymer having long chain branching, wherein said film is a multilayer film and is heat shrinkable, wherein the film comprises:
 (A) a first layer comprising ethylene/vinyl acetate copolymer;
 (B) a second layer comprising a blend of homogeneous ethylene/octene copolymer having long chain branching and ethylene/vinyl acetate copolymer;
 (C) a third layer comprising vinylidene chloride/methyl acrylate copolymer;
 (D) a fourth layer comprising a blend of ethylene/vinyl acetate copolymer and linear low density polyethylene.

7. A film suitable for packaging comprising a homogeneous single site catalyzed copolymer of ethylene and an alpha-olefin having from three to then carbon atoms, said single site catalyzed copolymer having long chain branching, wherein said film is a multilayer film and is heat shrinkable, wherein the film comprises:
 (A) a first layer comprising ethylene/vinyl acetate copolymer;

(B) a second layer comprising homogeneous ethylene/octene copolymer having long chain branching;
(C) a third layer comprising ethylene/vinyl acetate copolymer; and
(D) a fourth layer comprising vinylidene chloride/methyl acrylate copolymer; and
(E) a fifth layer comprising a blend of ethylene/vinyl acetate copolymer and linear low density ethylene/alpha-olefin copolymer.

* * * * *